United States Patent
Hsu et al.

(10) Patent No.: US 10,727,717 B2
(45) Date of Patent: Jul. 28, 2020

(54) DAMPING SYSTEM FOR GENERATING ELECTRICAL POWER

(71) Applicants: Chieh-Sen Tu, New Taipei (TW); Hsien-En Hsu, Changhua, Changhua County (TW)

(72) Inventors: Fu-Tzu Hsu, Taipei (TW); Hsien-En Hsu, Changhua (TW)

(73) Assignees: Chieh-Sen Tu, New Taipei (TW); Hsien-En Hsu, Changhua (TW)

(*) Notice: Subject to any disclaimer, the term of this patent is extended or adjusted under 35 U.S.C. 154(b) by 0 days.

(21) Appl. No.: 16/138,688

(22) Filed: Sep. 21, 2018

(65) Prior Publication Data

US 2019/0280556 A1 Sep. 12, 2019

(30) Foreign Application Priority Data

Mar. 6, 2018 (TW) .............................. 107107451 A (51) Int. Cl.
| | | |
|---|---|---|
| *H02K 7/02* | (2006.01) | |
| *H02K 7/18* | (2006.01) | |
| *H02K 1/12* | (2006.01) | |
| *H02K 7/116* | (2006.01) | |
| *H02K 7/00* | (2006.01) | |
| *F16F 15/30* | (2006.01) | |
| *F16H 48/20* | (2012.01) | |
| *F16H 37/08* | (2006.01) | |

(52) U.S. Cl.
CPC ............. *H02K 7/025* (2013.01); *F16F 15/30* (2013.01); *F16H 37/0813* (2013.01); *F16H 48/20* (2013.01); *H02K 1/12* (2013.01); *H02K 7/003* (2013.01); *H02K 7/116* (2013.01); *H02K 7/1807* (2013.01); *F16H 2048/202* (2013.01)

(58) Field of Classification Search
CPC ................................ H02K 7/025; F16F 15/30
USPC ................. 290/36 R; 322/4; 310/74; 74/396, 74/572.21
See application file for complete search history.

(56) References Cited

U.S. PATENT DOCUMENTS

| | | | | |
|---|---|---|---|---|
| 2,402,547 A | * | 6/1946 | Gilfillan | .................. F02B 67/04 290/36 R |
| 2,941,137 A | * | 6/1960 | Fehn, Sr. | .............. B30B 15/148 318/161 |
| 3,514,625 A | * | 5/1970 | Lane | ....................... H02J 9/066 307/67 |
| 3,904,883 A | * | 9/1975 | Horwinski | ............... B60K 6/26 290/50 |
| 3,970,917 A | * | 7/1976 | Diggs | ...................... H02K 7/02 322/4 |

(Continued)

*Primary Examiner* — Pedro J Cuevas
(74) *Attorney, Agent, or Firm* — Hamre, Schumann, Mueller & Larson, P.C.

(57) ABSTRACT

A damping system includes a flywheel motor device, a generator device, a flywheel power storage device and a power coupler device. When mechanical power generated by the flywheel motor device increases or remains constant, the power coupler device couples the mechanical power generated by the flywheel motor device to the generator device and the flywheel power storage device. When mechanical power generated by the flywheel motor device decreases, the power coupler device couples the mechanical power generated by the flywheel motor device and mechanical power outputted by the flywheel power storage device to the generator device.

8 Claims, 8 Drawing Sheets

(56) References Cited

U.S. PATENT DOCUMENTS

| | | | | |
|---|---|---|---|---|
| 4,182,967 A * | 1/1980 | Jordan | H02K 7/025 | 310/74 |
| 4,498,357 A * | 2/1985 | Makarov | F16H 33/18 | 475/267 |
| 5,065,060 A * | 11/1991 | Takahashi | F16F 15/30 | 310/113 |
| 5,245,270 A * | 9/1993 | Akiyama | F16C 32/0438 | 310/52 |
| 6,239,513 B1 * | 5/2001 | Dean | H02J 9/066 | 307/64 |
| 7,023,150 B2 * | 4/2006 | Hisada | B60L 58/12 | 318/34 |
| 7,042,108 B2 * | 5/2006 | Farkas | F01K 13/00 | 180/53.1 |
| 7,262,533 B2 * | 8/2007 | Fiset | H02K 16/00 | 310/113 |
| 7,479,091 B2 * | 1/2009 | Yang | B60K 6/105 | 477/108 |
| 7,633,248 B1 * | 12/2009 | Williams | E21B 19/006 | 318/150 |
| 8,182,391 B2 * | 5/2012 | Klemen | B60K 6/383 | 477/5 |
| 9,358,865 B1 * | 6/2016 | Sherry | B60K 6/105 | |
| 9,389,145 B2 * | 7/2016 | Andreae | G01M 15/102 | |
| 10,112,598 B1 * | 10/2018 | Johri | B60K 6/48 | |
| 2002/0171383 A1 * | 11/2002 | Hisada | F02D 41/042 | 318/432 |
| 2006/0181170 A1 * | 8/2006 | Fiset | H02K 16/00 | 310/113 |
| 2007/0037661 A1 * | 2/2007 | Yang | B60W 30/1882 | 477/115 |
| 2009/0288895 A1 * | 11/2009 | Klemen | B60W 10/06 | 180/65.25 |
| 2010/0083790 A1 * | 4/2010 | Graney | F16C 15/00 | 74/572.21 |
| 2011/0290051 A1 * | 12/2011 | Morgan | F16F 15/30 | 74/396 |
| 2014/0102187 A1 * | 4/2014 | Andreae | G01M 15/102 | 73/114.71 |
| 2015/0101421 A1 * | 4/2015 | Takahashi | G01L 3/045 | 73/862.325 |
| 2015/0188400 A1 * | 7/2015 | Kemp | H02K 53/00 | 310/74 |
| 2016/0276917 A1 * | 9/2016 | Miller | H02K 47/04 | |
| 2018/0141614 A1 * | 5/2018 | Hsu | B62M 9/04 | |

* cited by examiner

DAMPING SYSTEM FOR GENERATING ELECTRICAL POWER

CROSS-REFERENCE TO RELATED APPLICATION

This application claims priority of Taiwanese Patent Application No. 107107451, filed on Mar. 6, 2018.

FIELD

The disclosure relates to electricity generation, and more particularly to a damping system for generating electrical power.

BACKGROUND

In electricity generation, a generator is a device that converts mechanical power (e.g., hydraulic power, wind power, etc.) into electrical power. The generator cannot continuously generate the electrical power when it cannot continuously receive the mechanical power.

SUMMARY

Therefore, an object of the disclosure is to provide a damping system that can alleviate the drawback of the prior art.

According to the disclosure, the damping system includes a flywheel motor device, a generator device, a flywheel power storage device and a power coupler device. The flywheel motor device is used to be driven by a direct current electrical power to generate mechanical power. The generator device is capable of operating at a low rotary speed. The power coupler device is connected to the flywheel motor device, the generator device and the flywheel power storage device. When the mechanical power generated by the flywheel motor device increases or remains constant, the power coupler device couples the mechanical power generated by the flywheel motor device to the generator device and the flywheel power storage device, so as to drive the generator device to generate electrical power and drive the flywheel power storage device to store mechanical power. When the mechanical power generated by the flywheel motor device decreases, the flywheel power storage device outputs the mechanical power stored therein, and the power coupler device couples the mechanical power generated by the flywheel motor device and the mechanical power outputted by the flywheel power storage device to the generator device.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Moreover, it should be noted that throughout the disclosure, "damping" should be interpreted as "oscillating", and a swing of the oscillation may be increasing, constant or decreasing.

Figure 1:
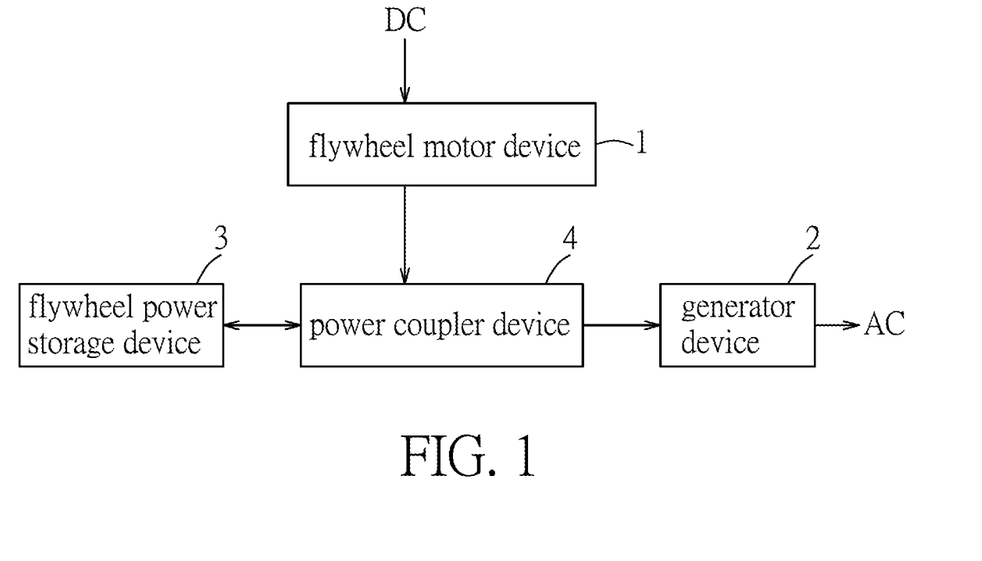
FIG. 1 is a block diagram illustrating a first embodiment of a damping system according to the disclosure.
Figure 2:
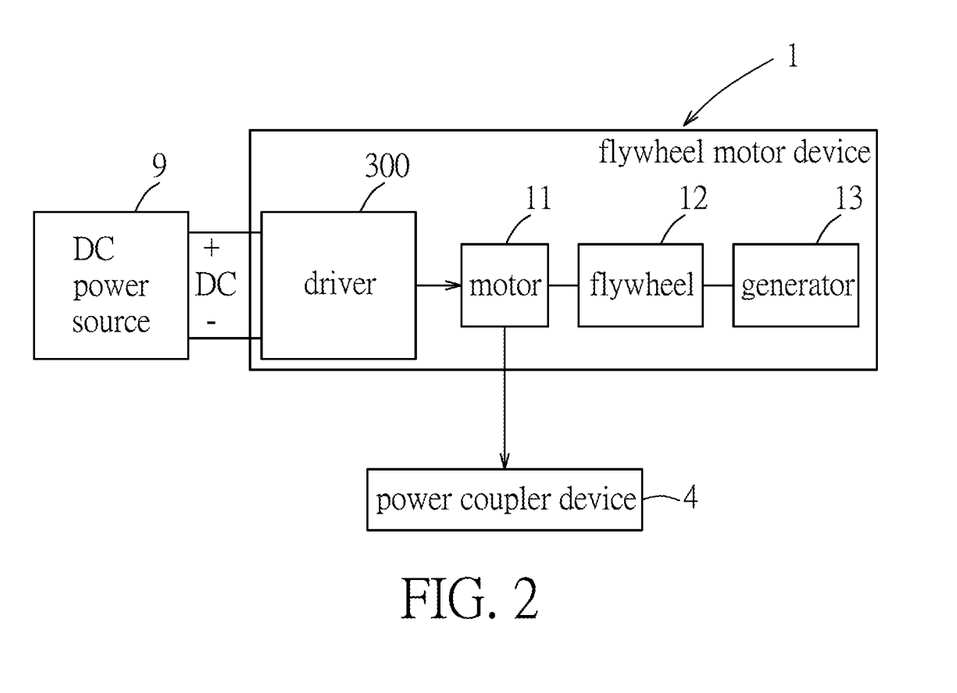
FIG. 2 is a block diagram illustrating a flywheel motor device of the first embodiment.
Figure 3:
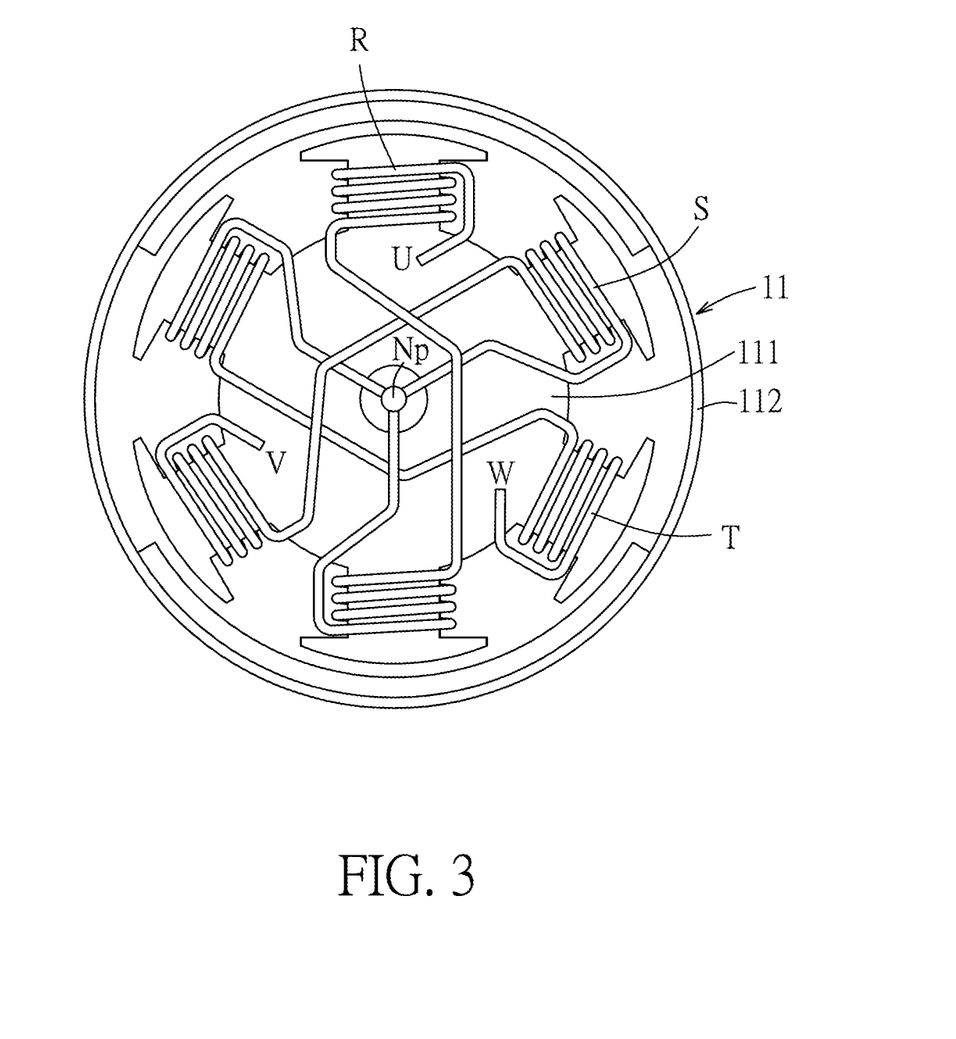
FIG. 3 is a structural diagram illustrating a motor of the flywheel motor device.
Figure 4:
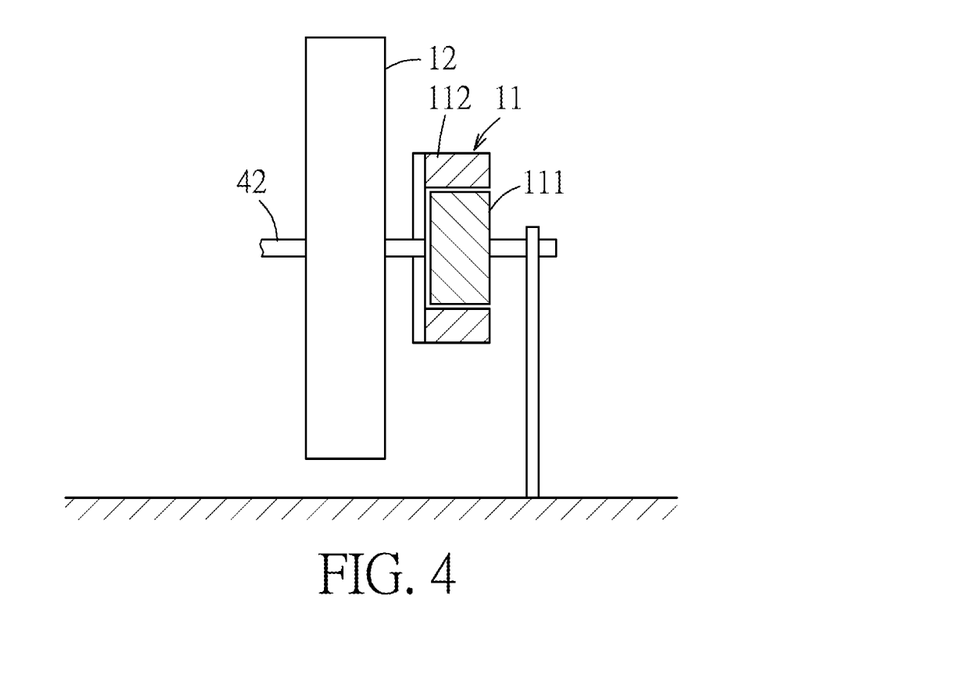
FIG. 4 is a structural diagram illustrating the motor and a flywheel of the flywheel motor device.
Figure 5:
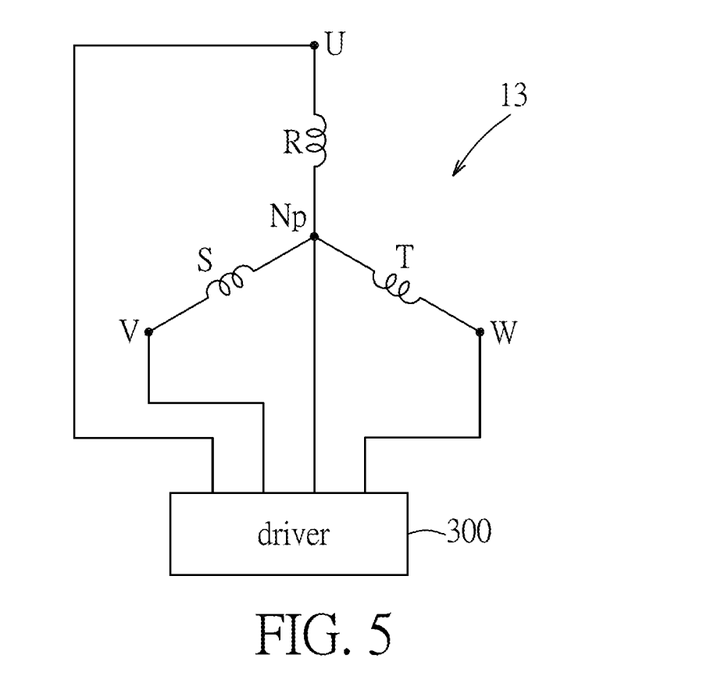
FIG. 5 is a circuit block diagram illustrating coils of the motor.

Referring to FIG. 1, a first embodiment of a damping system according to the disclosure includes a flywheel motor device 1, a generator device 2, a flywheel power storage device 3 and a power coupler device 4. The flywheel motor device 1 is used to be driven by a direct current (DC) electrical power (which is supplied by a DC power source 9 (see FIG. 2)) to generate mechanical power. The generator device 2 is capable of operating at a low rotary speed. The power coupler device 4 is connected to the flywheel motor device 1, the generator device 2 and the flywheel power storage device 3. When the mechanical power generated by the flywheel motor device 1 increases or remains constant, the power coupler device 4 couples the mechanical power generated by the flywheel motor device 1 to the generator device 2 and the flywheel power storage device 3, so as to drive the generator device 2 to generate alternating current (AC) electrical power and drive the flywheel power storage device 3 to store mechanical power. When the mechanical power generated by the flywheel motor device decreases, the flywheel power storage device 3 outputs the mechanical power stored therein, and the power coupler device 4 couples the mechanical power generated by the flywheel motor device 1 and the mechanical power outputted by the flywheel power storage device 3 to the generator device 2 so as to drive the generator device 2 to generate the AC electrical power.

Referring to FIGS. 2 to 5, in this embodiment, the flywheel motor device 1 includes a flywheel 12, a generator 13, a motor 11 and a driver 300. The generator 13 is connected to the flywheel 12. The motor 11 includes a stator 111, a rotor 112 that is connected to the flywheel 12, and a number (P) (P≥3, e.g., three in this embodiment) of coils (R, S, T) that are wound around the stator 111. The coils (R, S, T) cooperatively form a star configuration 13 that has a central terminal (Np) and a number (P) (three in this embodiment) of end terminals (U, V, W), with each of the coils (R, S, T) connected between a respective one of the end terminals (U, V, W) of the star configuration 13 and the central terminal (Np) of the star configuration 13. The driver 300 is connected to the end terminals (U, V, W) and the central terminal (Np) of the star configuration 13, is used to be powered by the DC electrical power, and drives the coils (R, S, T) to cause the rotor 112 to rotate (i.e., performing electrical to mechanical conversion). It should be noted that a combination of the motor 11, the flywheel 12 and the generator 13 may be implemented using a flywheel battery, but the disclosure is not limited thereto. In addition, in another embodiment, the flywheel motor device 1 may include more than one set of the coils (R, S, T), depending on practical application requirements. Moreover, in yet another embodiment, the generator 13 may be omitted, and the motor 11 may be one that can be used in reverse as a generator.

Figure 6:
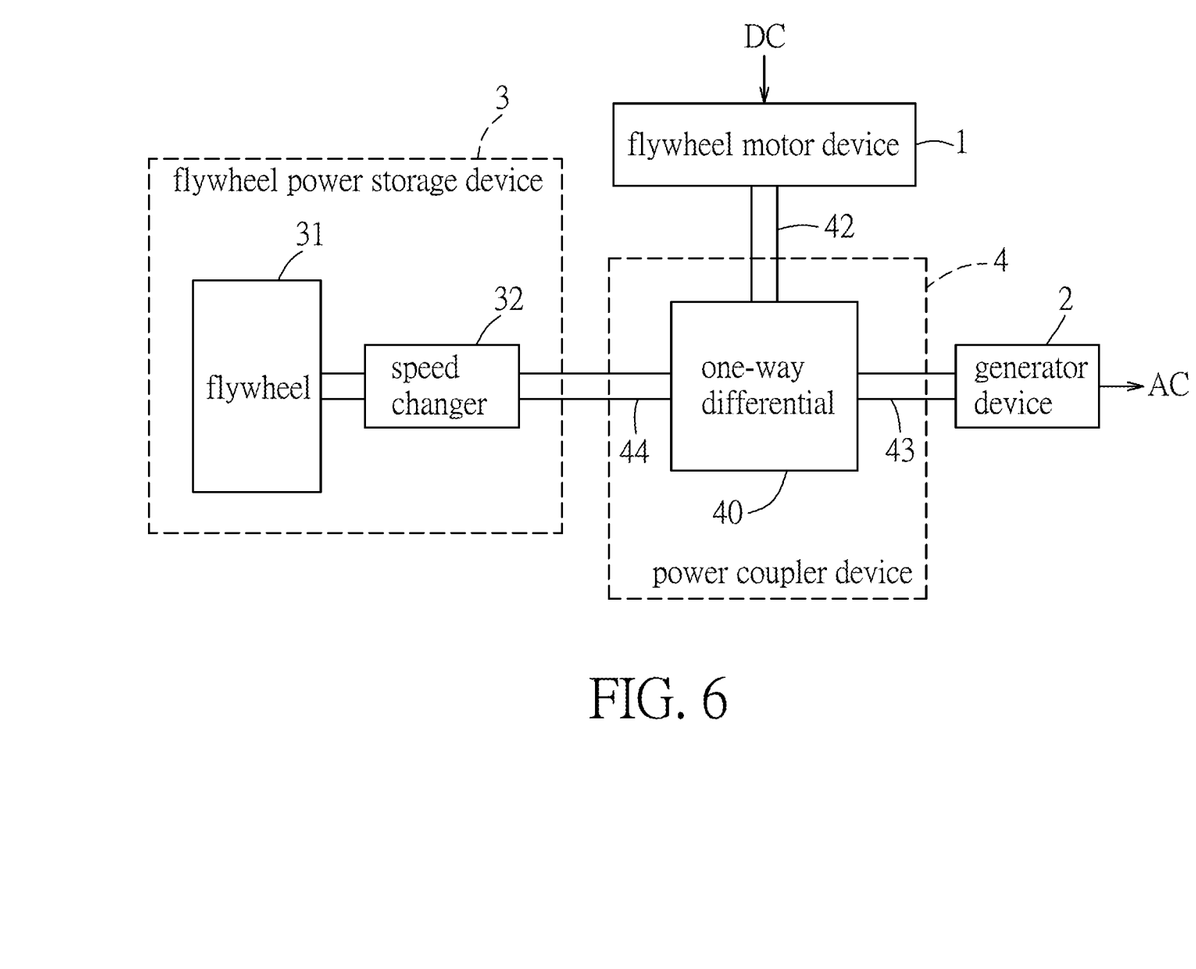
FIG. 6 is a schematic block diagram illustrating a flywheel power storage device and a power coupler device of the first embodiment.

Referring to FIG. 6, in this embodiment, the rotary speed of the generator device 2 when operating is generally within a range, for example, from 136 rpm to 144 rpm. In addition, the generator device 2 is one that can be easily driven by mechanical power to generate AC electrical power. For example, the generator device 2 is one that can be used in a wind power plant or the like, but the disclosure is not limited thereto. It should be noted that, in another embodiment, the electrical power generated by the generator device 2 may be DC, instead of AC.

In this embodiment, the flywheel power storage device 3 includes a speed changer 32 and a flywheel 31. The speed changer 32 is connected to the power coupler device 4. The flywheel 31 is connected to the speed changer 32, stores the mechanical power received from the power coupler device 4 via the speed changer 32 when the mechanical power generated by the flywheel motor device 1 increases or remains constant, and outputs the mechanical power stored therein to the power coupler device 4 via the speed changer 32 when the mechanical power generated by the flywheel motor device 1 decreases.

Figure 7:
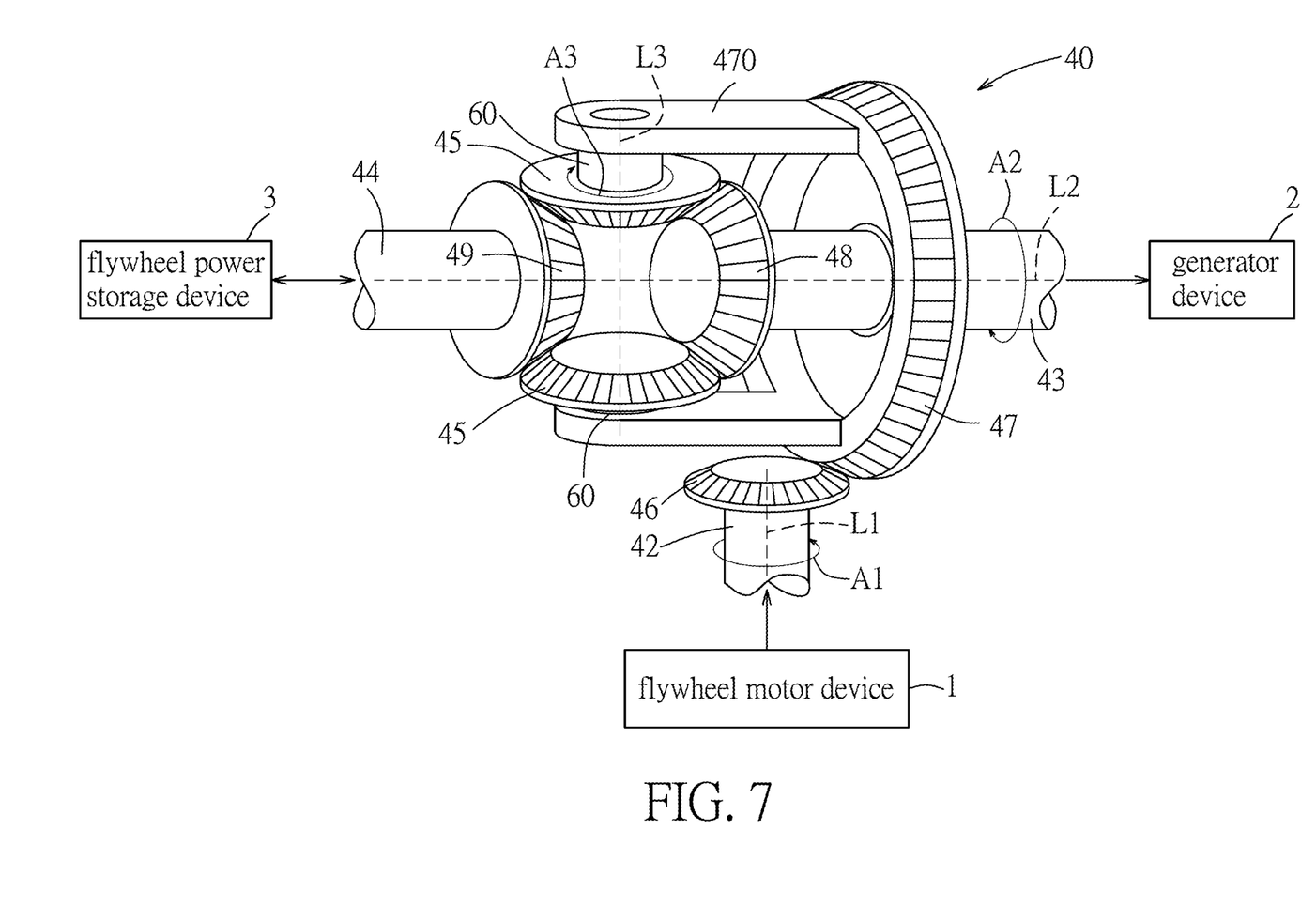
FIG. 7 is a structural block diagram illustrating a one-way differential of the power coupler device.

Referring to FIGS. 6 and 7, in this embodiment, the power coupler device 4 includes a one-way differential 40. The one-way differential 40 includes a drive gear 46, a driven gear 47, a carrier 470, two one-way bearings 60, two planet gears 45, a first gear 48, a second gear 49, an input shaft 42, a first output shaft 43 and a second output shaft 44. The drive gear 46 is rotatable about an axis (L1). The driven gear 47 is engaged with the drive gear 46, and is rotatable about an axis (L2) perpendicular to the axis (L1). The carrier 470 is connected to the driven gear 47, and is rotatable about the axis (L2). The planet gears 45 are pivotally connected to the carrier 470 respectively via the one-way bearings 60, are revolvable about the axis (L2), and are rotatable about an axis (L3) parallel to the axis (L1). The first gear 48 is engaged with the planet gears 45, and is rotatable about the axis (L2). The second gear 49 is engaged with the planet gears 45, and is rotatable about the axis (L2). The input shaft 42 is connected between the rotor 112 (see FIG. 4) and the drive gear 46, and is rotatable about the axis (L1). The first output shaft 43 is connected between the first gear 48 and the generator device 2, and is rotatable about the axis (L2). The second output shaft 44 is connected between the second gear 49 and the speed changer 32, and is rotatable about the axis (L2). The one-way bearings 60 allows rotation of the planet gears 45 in a direction (A3) as shown in FIG. 7, and prevents rotation of the planet gears 45 in a direction opposite to the direction (A3).

Operations of the damping system of this embodiment are described below. First, when the flywheel motor device 1 starts to be driven by the DC electrical power to generate constant mechanical power, the rotor 112 (see FIG. 4) causes the input shaft 42 and the drive gear 46 to rotate about the axis (L1) in a direction (A1) as shown in FIG. 7, the drive gear 46 causes the driven shaft 47 and the carrier 470 to rotate about the axis (L2) in a direction (A2) as shown in FIG. 7, the carrier 470 causes the planet gears 45 to revolve about the axis (L2) in the direction (A2), and the planet gears 45 cause the first and second gears 48, 49 and the first and second output shafts 43, 44 to rotate about the axis (L2) in the direction (A2), so the mechanical power generated by the flywheel motor device 1 is coupled to the generator device 2 and the speed changer 32 to drive the generator device 2 to rotate and generate the AC electrical power and drive, via the speed changer 32, the flywheel 31 to rotate and store the mechanical power. At the beginning, the flywheel 31 causes a rotary speed of the second output shaft 44 to be lower than a rotary speed of the first output shaft 43, and therefore the planet gears 45 rotate about the axis (L3) in the direction (A3). Thereafter, the flywheel 31 causes the rotary speed of the second output shaft 44 to gradually increase toward the rotary speed of the first output shaft 43, and therefore a rotary speed of the planet gears 45 gradually decreases toward zero.

Next, when the mechanical power generated by the flywheel motor device 1 decreases, the rotary speed of the first output shaft 43 drops below the rotary speed of the second output shaft 44, and the planet gears 45 stop rotating or remain stationary. At this time, the mechanical power stored in the flywheel 31 is coupled to the generator device 2 via the speed changer 32, the second output shaft 44, the second gear 49, the planet gears 45, the first gear 48 and the first output shaft 43, so as to, together with the mechanical power generated by the flywheel motor device 1, drive the generator device 2 to rotate and generate the AC electrical power.

Then, when the mechanical power generated by the flywheel motor device 1 increases, the rotary speed of the first output shaft 43 rises above the rotary speed of the second output shaft 44, and the planet gears 45 rotate about the axis (L3) in the direction (A3) again. At this time, the flywheel 31 no longer outputs the mechanical power stored therein, and instead stores the mechanical power received from the flywheel motor device 1 via the power coupler device 4 and the speed changer 32.

Therefore, the flywheel power storage device 3 serves as a buffer, and a combination of the flywheel power storage device 3 and the power coupler device 4 serves as a damper. The power coupler device 4 can cause a portion of the mechanical power generated by the flywheel motor device 1 to be stored in the flywheel power storage device 3 when the mechanical power generated by the flywheel motor device 1 increases or remains constant, and can cause the mechanical power stored in the flywheel power storage device 3 to be released to the generator device 2, resulting in damping effect, so the generator device 2 can continuously receive the mechanical power from the power coupler device 4 and generate the AC electrical power even if the flywheel motor device 1 cannot continuously generate the mechanical power.

Figure 8:
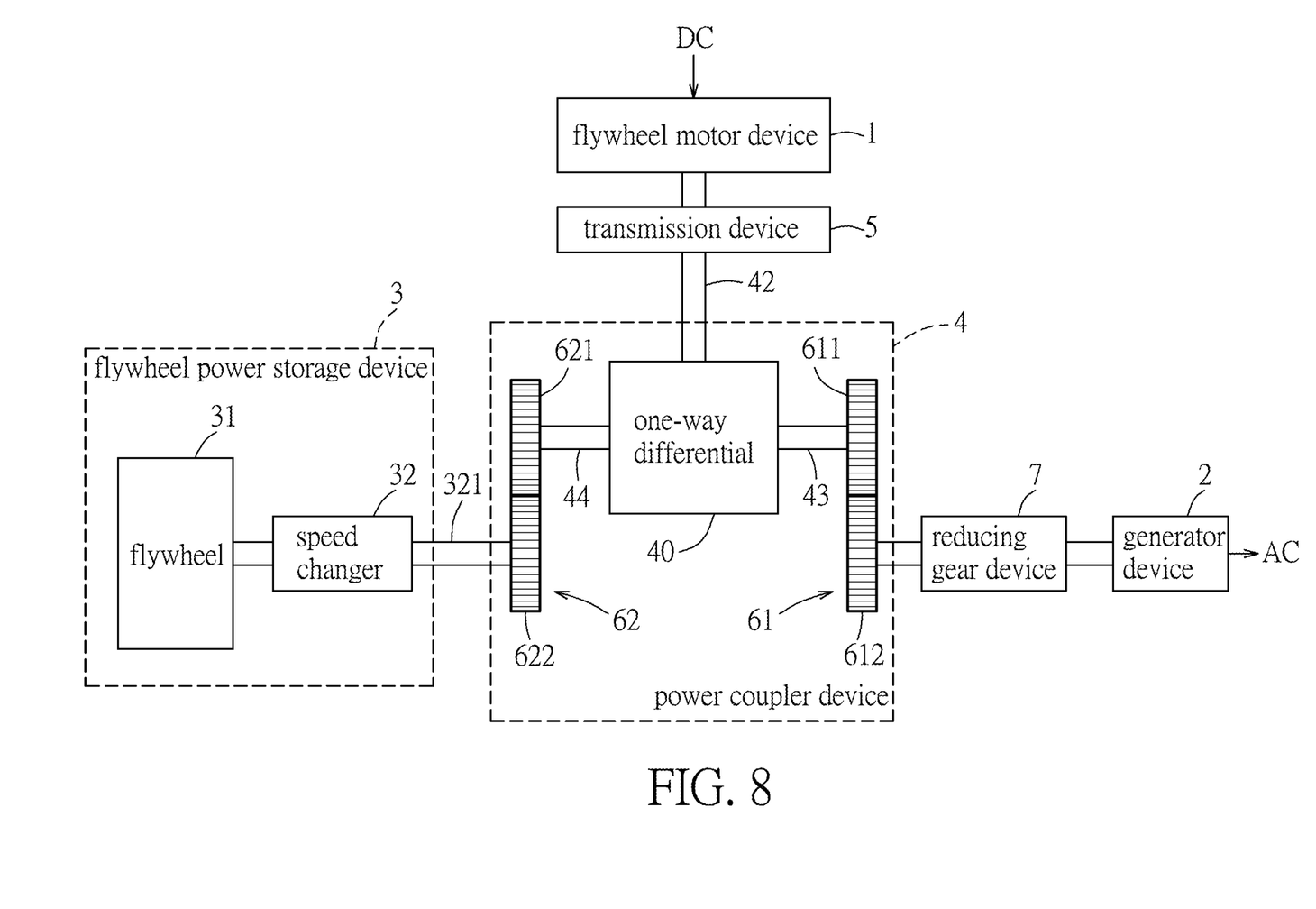
FIG. 8 is a schematic block diagram illustrating a second embodiment of the damping system according to the disclosure.

Referring to FIG. 8, a second embodiment of the damping system according to the disclosure is a modification of the first embodiment, and differs from the first embodiment in that: (a) the damping system further includes a transmission device 5 and a reducing gear device 7; and (b) the power coupler device 4 further includes a first gear set 61 and a second gear set 62.

Figure 9:
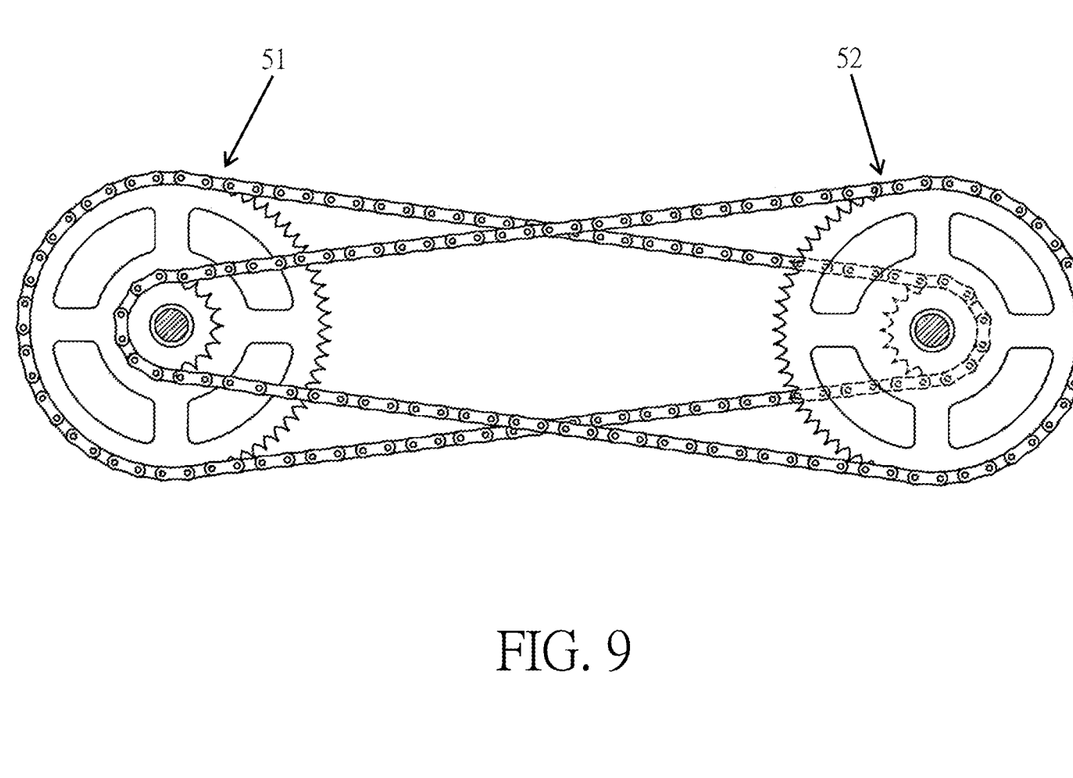
FIG. 9 is a structural diagram illustrating an exemplary implementation of a transmission device of the second embodiment.
Figure 10:
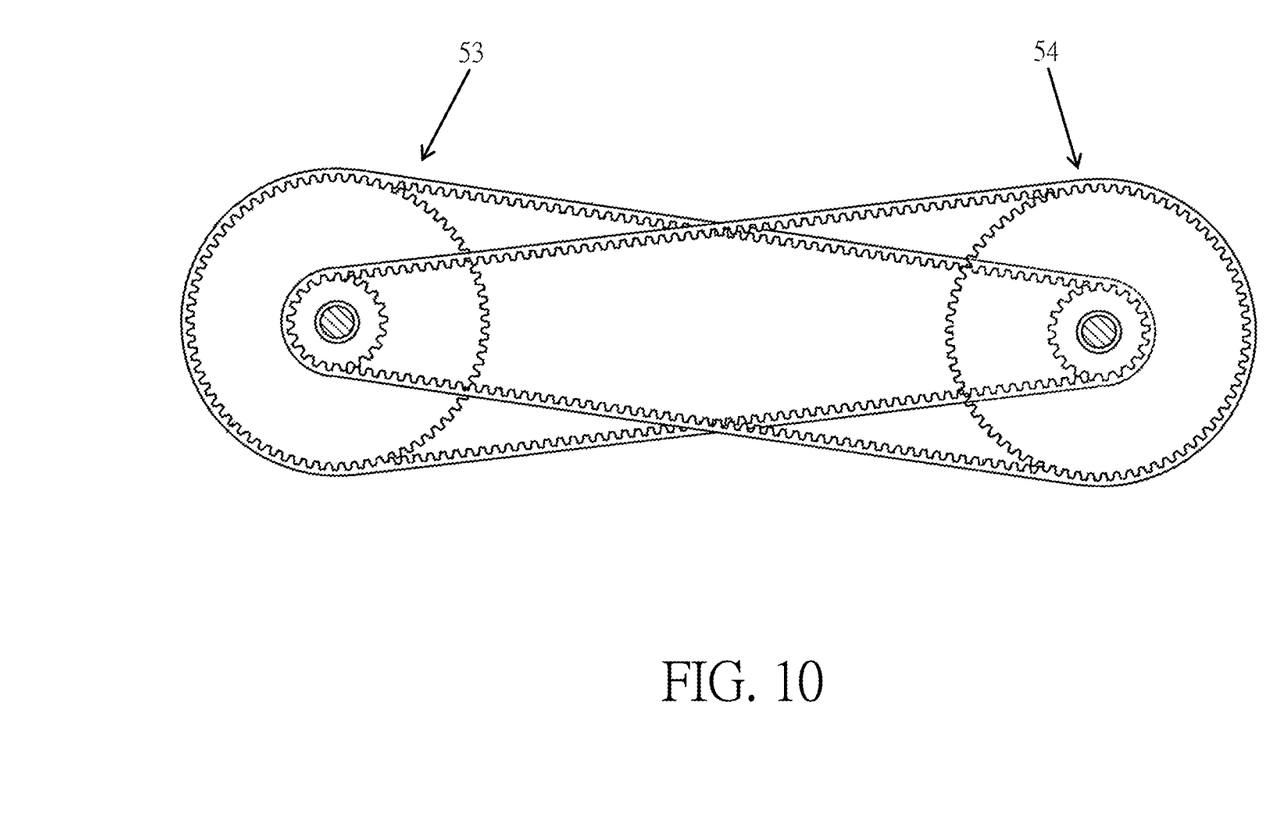
FIG. 10 is a structural diagram illustrating another exemplary implementation of the transmission device.

In the second embodiment, the transmission device 5 is connected between the rotor 112 (see FIG. 4) and the input shaft 42, and transmits the mechanical power generated by the flywheel motor device 1 to the input shaft 42. Two exemplary implementations of the transmission device 5 are respectively shown in FIGS. 9 and 10. In each of the implementations, the transmission device 5 includes a low-torque high-speed transmission mechanism 51, 53 and a high-torque low-speed transmission mechanism 52, 54 that cooperate with each other to smoothly transmit the mechanical power generated by the flywheel motor device 1 to the input shaft 42.

The first gear set 61 and the reducing gear device 7 are connected between the first output shaft 43 and the generator device 2. The first gear set 61 includes a third gear 611 that is connected to the first output shaft 43, and a fourth gear 612 that is engaged with the third gear 611. In this embodiment, the third and fourth gears 611, 612 have a gear ratio of 1:1, but the disclosure is not limited thereto. The reducing gear device 7 is connected between the fourth gear 612 and the generator device 2. The mechanical power is transmitted from the first output shaft 43 to the generator device 2 via the third and fourth gears 611, 612 and the reducing gear device 7. The reducing gear device 7 causes the rotary speed of the generator device 2 to be lower than the rotary speed of the first output shaft 43, so the generator device 2 can be easily driven with a high torque.

The second gear set 62 is connected between the second output shaft 44 and the speed changer 32, and includes a fifth gear 621 that is connected to the second output shaft 44, and a sixth gear 622 that is engaged with the fifth gear 621 and that is connected to the speed changer 32. In this embodiment, the fifth and sixth gears 621, 622 have a gear ratio of 1:1, but the disclosure is not limited thereto. The mechanical power is transmitted between the second output shaft 44 and the flywheel 31 via the fifth and sixth gears 621, 622 and the speed changer 32.

It should be noted that, in another embodiment, the first gear set 61 may be omitted, and the reducing gear device 7 may be directly connected to the first output shaft 43.

In view of the above, for each of the aforesaid embodiments, the generator device 2 can continuously receive the mechanical power from the power coupler device 4 and generate the AC electrical power even if the flywheel motor device 1 cannot continuously generate the mechanical power, since: (a) when the mechanical power generated by the flywheel motor device 1 increases or remains constant, the power coupler device 4 couples the mechanical power generated by the flywheel motor device 1 to the generator device 2 and the flywheel power storage device 3, so as to drive the generator device 2 to generate the AC electrical power and drive the flywheel power storage device 3 to store the mechanical power; and (b) when the mechanical power generated by the flywheel motor device 1 decreases, the flywheel power storage device 3 outputs the mechanical power stored therein, and the power coupler device 4 couples the mechanical power generated by the flywheel motor device 1 and the mechanical power outputted by the flywheel power storage device 3 to the generator device 2.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that the disclosure is not limited to the disclosed embodiments but is intended to cover various arrangements included within the spirit and scope of the broadest interpretation so as to encompass all such modifications and equivalent arrangements.

What is claimed is:

1. A damping system comprising:
   a flywheel motor device used to be driven by a direct current (DC) electrical power to generate mechanical power;
   a generator device capable of operating at a low rotary speed;
   a flywheel power storage device; and
   a power coupler device connected to said flywheel motor device, said generator device and said flywheel power storage device;
   when the mechanical power generated by said flywheel motor device increases or remains constant, said power coupler device coupling the mechanical power generated by said flywheel motor device to said generator device and said flywheel power storage device, so as to drive said generator device to generate electrical power and drive said flywheel power storage device to store mechanical power;
   when the mechanical power generated by said flywheel motor device decreases, said flywheel power storage device outputting the mechanical power stored therein, and said power coupler device coupling the mechanical power generated by said flywheel motor device and the mechanical power outputted by said flywheel power storage device to said generator device;
   said power coupler device including a one-way differential;
   said one-way differential including an input shaft connected to said flywheel motor device, a first output shaft connected to said generator device, and a second output shaft connected to said flywheel power storage device;
   said one-way differential allowing a rotary speed of said second output shaft to be lower than a rotary speed of said first output shaft, and preventing the rotary speed of said second output shaft to be higher than the rotary speed of said first output shaft.

2. The damping system of claim 1, wherein said flywheel motor device includes:
   a flywheel;
   a motor including a stator, a rotor that is connected to said flywheel, and a number of coils that are wound around said stator, where the number of coils being greater than or equal to 3, said coils cooperatively forming a star configuration that has a central terminal and a number of end terminals, the number of coils being equal to the number of end terminals, with each of said coils connected between a respective one of said end terminals of said star configuration and said central terminal of said star configuration; and
   a driver connected to said end terminals and said central terminal of said star configuration, used to be powered by the DC electrical power, and driving said coils to cause said rotor to rotate.

3. The damping system of claim 1, wherein said flywheel power storage device includes:
- a speed changer connected to said power coupler device; and
- a flywheel connected to said speed changer, storing the mechanical power received from said power coupler device via said speed changer when the mechanical power generated by said flywheel motor device increases or remains constant, and outputting the mechanical power stored therein to said power coupler device via said speed changer when the mechanical power generated by said flywheel motor device decreases.

4. The damping system of claim 1, wherein said one-way differential further includes:
- a drive gear connected to said input shaft;
- a driven gear engaged with said drive gear;
- a carrier connected to said driven gear;
- two one-way bearings;
- two planet gears pivotally connected to said carrier respectively via said one-way bearings;
- a first gear engaged with said planet gears, and connected to said first output shaft; and
- a second gear engaged with said planet gears, and connected to said second output shaft;
- wherein said one-way bearings allows rotation of said planet gears when a rotary speed of said first gear is higher than a rotary speed of said second gear, and prevents rotation of said planet gears when the rotary speed of said first gear is lower than the rotary speed of said second gear.

5. The damping system of claim 4, wherein said power coupler device further includes:
- a first gear set connected between said first output shaft and said generator device, and including a third gear that is connected to said first output shaft, and a fourth gear that is engaged with said third gear and that is connected to said generator device; and
- a second gear set connected between said second output shaft and said flywheel power storage device, and including a fifth gear that is connected to said second output shaft, and a sixth gear that is engaged with said fifth gear and that is connected to said flywheel power storage device.

6. The damping system of claim 5; further comprising a reducing gear device that is connected between said fourth gear and said generator device, and that causes a rotary speed of said generator device to be lower than a rotary speed of said first output shaft.

7. The damping system of claim 4, further comprising a transmission device that is connected between said flywheel motor device and said input shaft, and that transmits the mechanical power generated by said flywheel motor device to said input shaft.

8. The damping system of claim 4, further comprising a reducing gear device that is connected between said first output shaft and said generator device, and that causes a rotary speed of said generator device to be lower than a rotary speed of said first output shaft.

* * * * *